US007876258B2

(12) United States Patent
Abraham et al.

(10) Patent No.: US 7,876,258 B2
(45) Date of Patent: Jan. 25, 2011

(54) AIRCRAFT COLLISION SENSE AND AVOIDANCE SYSTEM AND METHOD

(75) Inventors: Michael R. Abraham, O'Fallon, MO (US); Christian C. Witt, Albuquerque, NM (US); Dennis J. Yelton, Albuquerque, NM (US); John N. Sanders-Reed, Cedar Crest, NM (US); Christopher J. Musial, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 11/374,807

(22) Filed: Mar. 13, 2006

(65) Prior Publication Data

US 2007/0210953 A1 Sep. 13, 2007

(51) Int. Cl.
*G01S 13/00* (2006.01)

(52) U.S. Cl. ......................... 342/29; 342/140; 342/159; 342/179

(58) Field of Classification Search .................. 342/29, 342/179, 159, 140
See application file for complete search history.

(56) References Cited

U.S. PATENT DOCUMENTS

| | | | | |
|---|---|---|---|---|
| 5,321,406 | A * | 6/1994 | Bishop et al. | 342/32 |
| 5,581,250 | A | 12/1996 | Khvilivitzky | |
| 6,799,114 | B2 * | 9/2004 | Etnyre | 701/120 |
| 6,804,607 | B1 * | 10/2004 | Wood | 701/301 |
| 2002/0057216 | A1 * | 5/2002 | Richardson et al. | 342/25 |
| 2004/0024528 | A1 * | 2/2004 | Patera et al. | 701/301 |
| 2004/0099787 | A1 * | 5/2004 | Dolne et al. | 250/201.2 |
| 2005/0024256 | A1 * | 2/2005 | Ridderheim et al. | 342/29 |
| 2005/0073433 | A1 * | 4/2005 | Gunderson et al. | 340/903 |
| 2005/0109872 | A1 | 5/2005 | Voos et al. | |
| 2006/0145913 | A1 * | 7/2006 | Kaltschmidt et al. | 342/29 |
| 2007/0252748 | A1 * | 11/2007 | Rees et al. | 342/29 |

FOREIGN PATENT DOCUMENTS

| | | |
|---|---|---|
| DE | 1505556 | 2/2005 |

OTHER PUBLICATIONS

Sanders-Reed, et al., "Multi-Target Tracking In Clutter", Proc. of the SPIE, Apr. 2002, 4724.*

(Continued)

*Primary Examiner*—Thomas H Tarcza
*Assistant Examiner*—Timothy A Brainard
(74) *Attorney, Agent, or Firm*—Law Office of Charles W. Peterson, Jr.

(57) ABSTRACT

A collision sense and avoidance system and method and an aircraft, such as an Unmanned Air Vehicle (UAV) and/or Remotely Piloted Vehicle (RPV), including the collision sense and avoidance system. The collision sense and avoidance system includes an image interrogator identifies potential collision threats to the aircraft and provides maneuvers to avoid any identified threat. Motion sensors (e.g., imaging and/or infrared sensors) provide image frames of the surroundings to a clutter suppression and target detection unit that detects local targets moving in the frames. A Line Of Sight (LOS), multi-target tracking unit, tracks detected local targets and maintains a track history in LOS coordinates for each detected local target. A threat assessment unit determines whether any tracked local target poses a collision threat. An avoidance maneuver unit provides flight control and guidance with a maneuver to avoid any identified said collision threat.

32 Claims, 3 Drawing Sheets

OTHER PUBLICATIONS

Sanders-Reed, et al., "Multi-Target Tracking in Clutter", Proc. of the SPIE, Apr. 2002, 4724.*

J.N. Sanders-Reed, Multi-Target, Multi-Sensor, Closed Loop Tracking, J. Proc. of the SPIE, Apr. 2004.

Sanders-Reed, et al., Multi-Target Tracking in Clutter , Proc. of the SPIE, Apr. 2002, 4724.

PCT ISR Feb. 18, 2008.

* cited by examiner

AIRCRAFT COLLISION SENSE AND AVOIDANCE SYSTEM AND METHOD

BACKGROUND OF THE INVENTION

1. Field of the Invention

The present invention generally relates to controlling small payload air vehicles in flight, and more particularly, to automatically controlling Unmanned Air Vehicles (UAVs) and Remotely Piloted Vehicles (RPVs) to sense and avoid potential collisions with other local air vehicles.

2. Background Description

Currently, Unmanned Air Vehicles (UAVs) and/or Remotely Piloted Vehicles (RPVs) are accompanied by a manned "chaperone" aircraft to mitigate risk of collision when operating in National Air Space (NAS). A chaperone is particularly necessary to assure that the aircraft (UAV or RPV) does not collide with other manned or unmanned aircraft operating in the vicinity or vice versa. Unfortunately, chaperoning such a vehicle is labor intensive and not particularly useful, other than for test and demonstration purposes.

Manned aircraft rely on air traffic control, transponders, and pilot vision for collision avoidance. While transponders are required on all commercial aircraft, many private aircraft do not carry transponders, and transponders may not be utilized in combat situations. Further, there have been cases of air traffic control issuing commands that contradict transponder avoidance recommendations. For manned aircraft, the human pilot visually identifies local moving objects and makes a judgment call as to whether each object poses a collision threat. Consequently, vision based detection is necessary and often critical in detecting other aircraft in the local vicinity.

Currently, the Federal Aviation Administration (FAA) is seeking an "equivalent level of safety" compared to existing manned aircraft for operating such aircraft in the NAS. While airspace could be restricted around UAVs or UAVs could be limited to restricted airspace to eliminate the possibility of other aircraft posing a collision risk, this limits the range of missions and conditions under which an unmanned aircraft can be employed. So, an unaccompanied UAV must also have some capability to detect and avoid any nearby aircraft. An unmanned air vehicle may be equipped to provide a live video feed from the aircraft (i.e., a video camera relaying a view from the "cockpit") to the ground-based pilot that remotely pilots the vehicle in congested airspace. Unfortunately, remotely piloting vehicles with onboard imaging capabilities requires both additional transmission capability for both the video and control, sufficient bandwidth for both transmissions, and a human pilot continuously in the loop. Consequently, equipping and remotely piloting such a vehicle is costly. Additionally, with a remotely piloted vehicle there is an added delay both in the video feed from the vehicle to when it is viewable/viewed and in the remote control mechanism (i.e., between when the pilot makes course corrections and when the vehicle changes course). So, such remote imaging, while useful for ordinary flying, is not useful for timely threat detection and avoidance.

Thus, there is a need for a small, compact, lightweight, real-time, on-board collision sense and avoidance system with a minimal footprint, especially for unmanned vehicles, that can detect and avoid collisions with other local airborne targets. Further, there is a need for such a collision sense and avoidance system that can determine the severity of threats from other local airborne objects under any flight conditions and also determine an appropriate avoidance maneuver.

SUMMARY OF THE INVENTION

An embodiment of the present invention detects objects in the vicinity of an aircraft that may pose a collision risk. Another embodiment of the present invention may propose evasive maneuvers to an aircraft for avoiding any local objects that are identified as posing a collision risk to the aircraft. Yet another embodiment of the present invention visually locates and automatically detects objects in the vicinity of an unmanned aircraft that may pose a collision risk to the unmanned aircraft, and automatically proposes an evasive maneuver for avoiding any identified collision risk.

In particular, embodiments of the present invention include a collision sense and avoidance system and an aircraft, such as an Unmanned Air Vehicle (UAV) and/or Remotely Piloted Vehicle (RPV), including the collision sense and avoidance system. The collision sense and avoidance includes an image interrogator that identifies potential collision threats to the aircraft and provides maneuvers to avoid any identified threat. Motion sensors (e.g., imaging and/or infrared sensors) provide image frames of the surroundings to a clutter suppression and target detection unit that detects local targets moving in the frames. A Line Of Sight (LOS), multi-target tracking unit, tracks detected local targets and maintains a track history in LOS coordinates for each detected local target. A threat assessment unit determines whether any tracked local target poses a collision threat. An avoidance maneuver unit provides flight control and guidance with a maneuver to avoid any identified said collision threat.

Advantageously, a preferred collision sense and avoidance system provides a "See & Avoid" or "Detect and Avoid" capability to any aircraft, not only identifying and monitoring local targets, but also identifying any that may pose a collision threat and providing real time avoidance maneuvers. A preferred image interrogator may be contained within one or more small image processing hardware modules that contain the hardware and embedded software and that weighs only a few ounces. Such a dramatically reduced size and weight enables making classic detection and tracking capability available even to a small UAV, e.g., ScanEagle or smaller.

While developed for unmanned aircraft, a preferred sense and avoidance system has application to alerting pilots of manned aircraft to unnoticed threats, especially in dense or high stress environments. Thus, a preferred collision sense and avoidance system may be used with both manned and unmanned aircraft. In a manned aircraft, a preferred collision sense and avoidance system augments the pilot's vision. In an unmanned aircraft, a preferred collision sense and avoidance system may be substituted for the pilot's vision, detecting aircraft that may pose collision risks, and if necessary, proposing evasive maneuvers to the unmanned aircraft's flight control.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
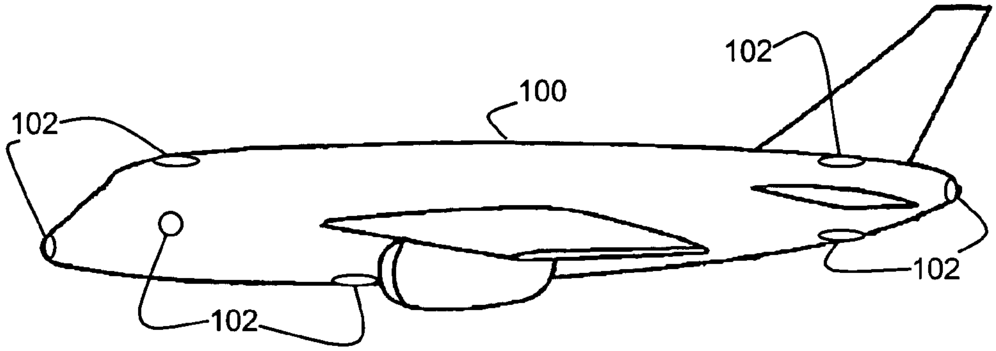
FIG. 1 shows an example of an aircraft, e.g., an Unmanned Air Vehicle (UAV) or Remotely Piloted Vehicle (RPV), with a collision sense and avoidance system according to an advantageous embodiment of the present invention.

Turning now to the drawings, and more particularly, FIG. 1 shows an example of a preferred embodiment aircraft 100, e.g., an Unmanned Air Vehicle (UAV) or Remotely Piloted Vehicle (RPV), with a collision sense and avoidance system according to a preferred embodiment of the present invention. A suitable number of typical motion sensors 102 are disposed to detect moving objects in the vicinity of the host aircraft 100. The motion sensors 102 may be, for example, any suitable visible band sensors to mimic human vision, or infra-red (IR) sensors for detecting object motion in periods of poor or limited visibility, e.g., in fog or at night. The sensors 102 are connected to a preferred embodiment image interrogator in the host aircraft 100 that accepts real-time image data from the sensors 102 and processes the image data to detect airborne targets, e.g., other aircraft, even against cluttered backgrounds. The image interrogator builds time histories in Line Of Sight (LOS) space. The target histories indicate the relative motion of detected targets. Each detected target is categorized based on its relative motion and assigned a threat level category determined from passive sensor angles and apparent target size and/or intensity. Based on each target's threat level category, the image interrogator determines if an evasive maneuver is in order and, if so, proposes an appropriate evasive maneuver to avoid any potential threats. The preferred embodiment image interrogator also can provide LOS target tracks and threat assessments to other conflict avoidance routines operating at a higher level, e.g., to a remotely located control station.

Figure 2:
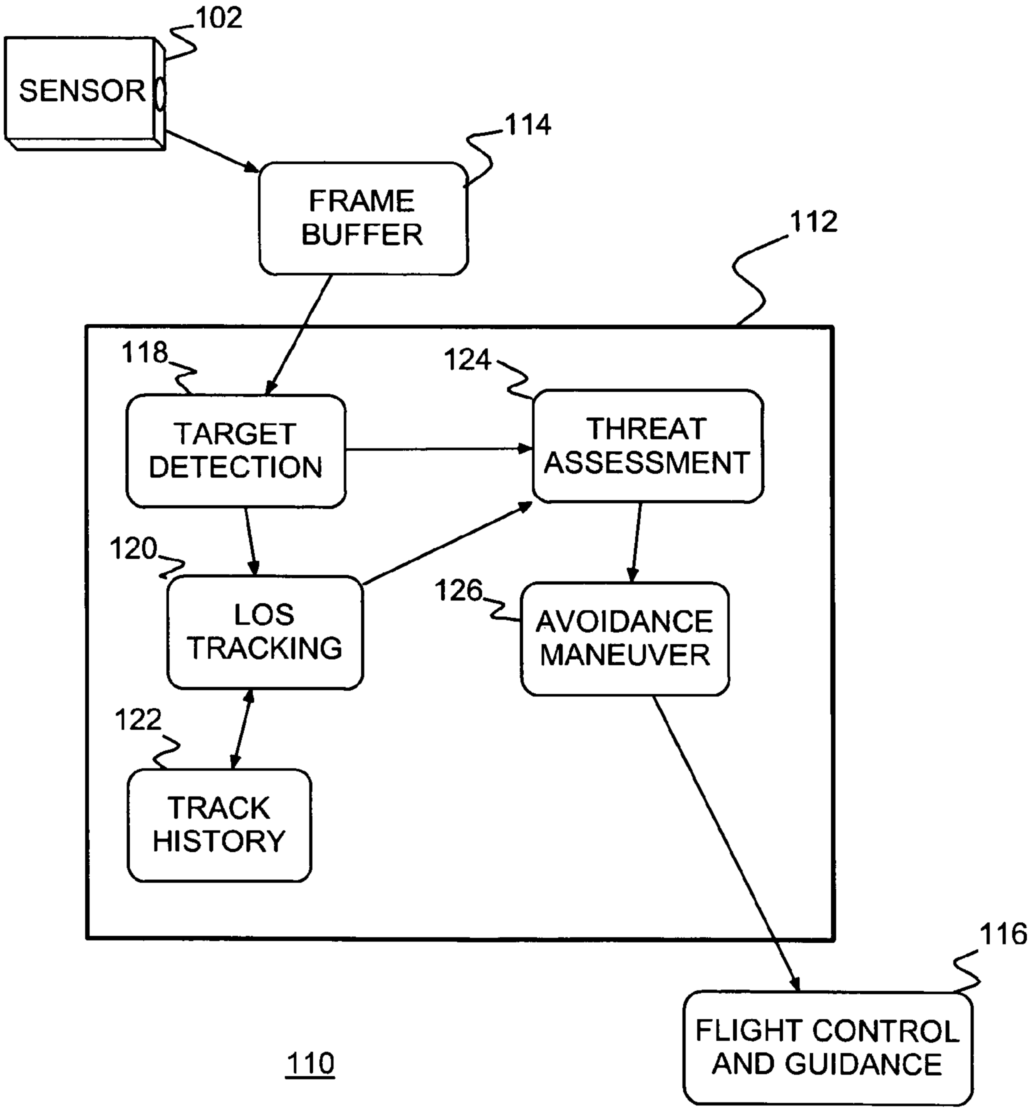
FIG. 2 shows an example of a preferred image interrogator receiving motion data from sensors and passing collision avoidance maneuvers to flight control and guidance.

FIG. 2 shows an example of a preferred collision sense and avoidance system 110 that includes an image interrogator 112 receiving motion data from sensors 102 through frame buffer 114 and passing evasive maneuvers to flight control and guidance 116, as needed. Preferably, the collision sense and avoidance system 110 is an intelligent agent operating in a suitable enhanced vision system. One example of a suitable such enhanced vision system is described in U.S. patent application Ser. No. 10/940,276 entitled "Situational Awareness Components of an Enhanced Vision System," to Sanders-Reed et al., filed Sep. 14, 2004, assigned to the assignee of the present invention and incorporated herein by reference. Also, the preferred image interrogator 112 is implemented in one or more Field Programmable Gate Array (FPGA) processors with an embedded general purpose Central Processing Unit (CPU) core. A Typical state of the art FPGA processor, such as a Xilinx Virtex-II for example, is a few inches square with a form factor of a stand-alone processor board. So, the overall FPGA processor may be a single small processor board embodied in a single 3.5" or even smaller cube, requiring no external computer bus or other system specific infra-structure hardware. Embodied in such a FPGA processor, the image interrogator 112 can literally be glued to the side of a very small UAV, such as the ScanEagle from The Boeing Company.

Image data from one or more sensor(s) 102 may be buffered temporarily in the frame buffer 114, which may simply be local Random Access Memory (RAM), Static or dynamic (SRAM or DRAM) in the FPGA processor, designated permanently or temporarily for frame buffer storage. Each sensor 102 may be provided with a dedicated frame buffer 114, or a shared frame buffer 114 may temporarily store image frames for all sensors. The image data is passed from the frame buffer 114 to a clutter suppression and target detection unit 118 in the preferred image interrogator 112. The clutter suppression and target detection unit 118 is capable of identifying targets under any conditions, e.g., against a natural sky, in clouds, and against terrain backgrounds, and under various lighting conditions. A LOS, multi-target tracking unit 120 tracks targets identified in the target detection unit 118 in LOS coordinates. The LOS, multi-target tracking unit 120 also maintains a history 122 of movement for each identified target. A threat assessment unit 124 monitors identified targets and the track history for each to determine the likelihood of a collision with each target. An avoidance maneuver unit 126 determines a suitable avoidance maneuver for any target deemed to be on a collision course with the host aircraft. The avoidance maneuver unit 126 passes the avoidance maneuvers to flight control and guidance 116 for execution.

The clutter suppression and target detection unit 118 and the LOS, multi-target tracking unit 120 may be implemented using any of a number of suitable, well known algorithms that are widely used in target tracking. Preferably, clutter suppression and target detection is either implemented in a single frame target detection mode or a multi-frame target detection mode. In the single frame mode each frame is convolved with an Optical Point Spread Function (OPSF). As a result, single pixel noise is rejected, as are all large features, i.e., features that are larger than a few pixels in diameter. So, only unresolved or nearly unresolved shapes remain to identify actual targets. An example of a suitable multi-frame moving target detection approach, generically referred to as a Moving Target Indicator (MTI), is provided by Sanders-Reed, et al., "Multi-Target Tracking In Clutter," *Proc. of the SPIE,* 4724, April 2002. Sanders-Reed, et al. teaches assuming that a moving target moves relative to background, and hence, everything moving with a constant apparent velocity (the background) is rejected with the result leaving only moving targets.

The track history 122 provides a time history of each target's motion and may be contained in local storage, e.g., as a table or database. Previously, since typical state of the art tracking units simply track targets in focal plane pixel coordinates, a high level coordinate system was necessary to understand target motion. However, the preferred embodiment collision sense and avoidance system 110 does not require such a high level coordinate system and instead, the LOS, multi-target tracking unit 120 collects track history 122 in LOS coordinates. See, e.g., J. N. Sanders-Reed "Multi-Target, Multi-Sensor, Closed Loop Tracking," *J. Proc. of the SPIE,* 5430, April 2004, for an example of a system that develops, maintains and uses a suitable track history.

Figure 3:
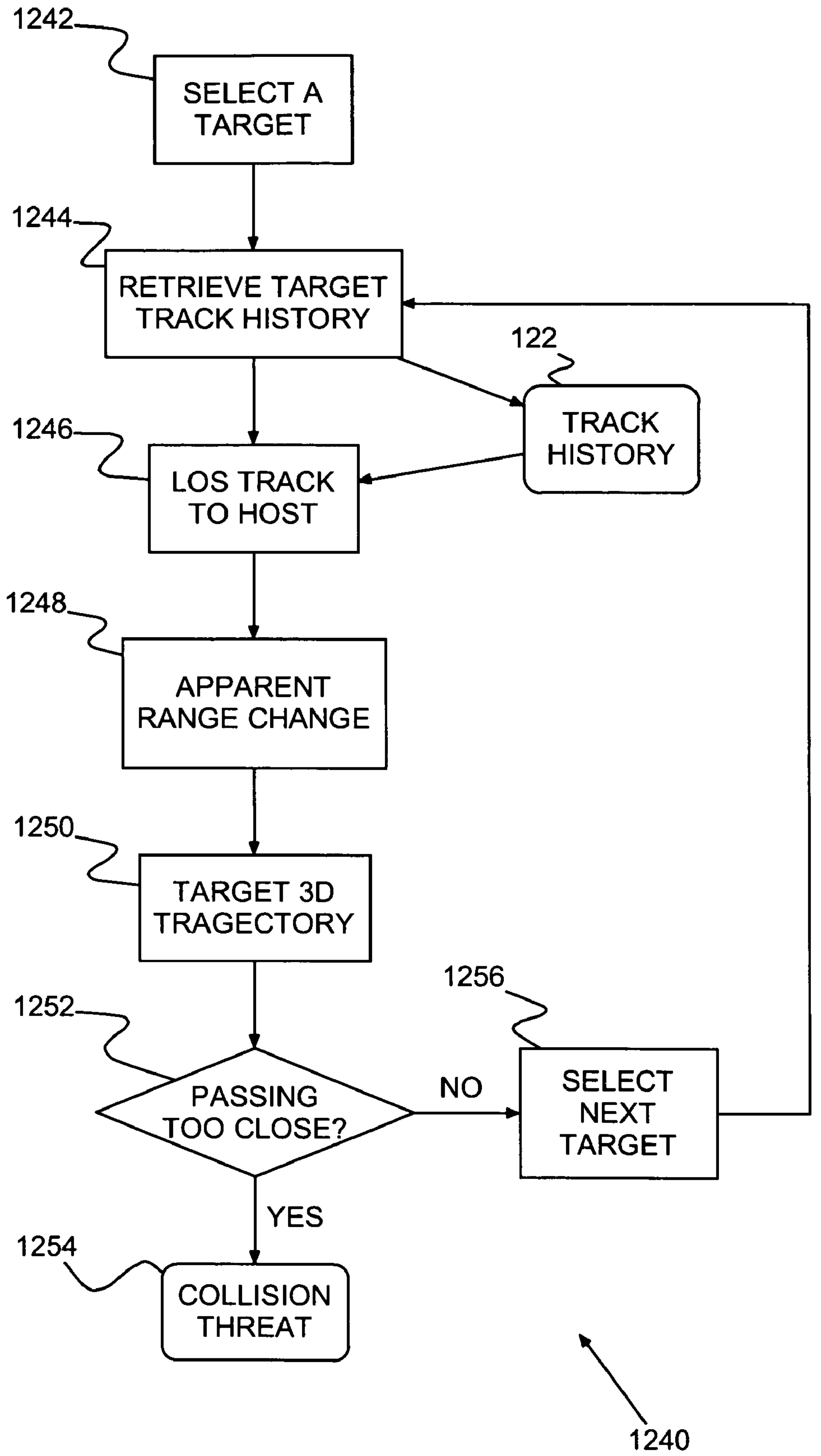
FIG. 3 shows an example of threat assessment 1240 to determine whether each detected target is on a possible collision course with the host aircraft.

FIG. 3 shows an example of threat assessment 1240, e.g., in the threat assessment unit 124, to determine whether each detected target is on a possible collision course with the host aircraft. Preferably, for simplicity, the threat assessment unit 124 determines whether the relative position of each target is changing based on the track history for an "angles only" imaging approach. So, for example, beginning in 1242 an identified target is selected by the threat assessment unit 124. Then, in 1244 the track history is retrieved from track history storage 122 for the selected target. Next in 1246 a LOS track is determined for the selected target relative to the host aircraft, e.g., from the target's focal plane track and from the known attitude and optical sensor characteristics. In 1248 the threat assessment unit 124 determines an apparent range from the target's apparent change in size and/or intensity. Then, in 1250 the threat assessment unit 124 correlates the LOS track with the apparent range to reconstruct a three-dimensional (3D) relative target trajectory. The 3D trajectory may be taken with respect to the host aircraft and to within a constant scaling factor. All other things being equal, a waxing target is approaching, and a waning target is regressing. So, the threat assessment unit 124 can determine an accurate collision risk assessment in 1252 relative to the mean apparent target diameter even without knowing this scaling factor, i.e., without knowing the true range. If in 1252 it is determined that the target is passing too close to the host aircraft, then an indication that the target is a collision threat 1254 is passed to the avoidance maneuver unit 126. If the threat assessment unit 124 determines in 1252 that the selected target is not a collision threat, another target is selected in 1256 and, returning to 1242 the threat assessment unit 124 determines whether that target is a threat.

So, for example, the threat assessment unit 124 might determine in 1250 that within the next 30 seconds a target will approach within one mean target diameter of the host aircraft. Moreover, the threat assessment unit 124 may deem in 1252 that this a collision risk 1254 regardless of the true size and range of the target.

Optionally, the threat assessment unit 124 can make a probabilistic estimate in 1252 of whether a true range estimate is desired or deemed necessary. In those instances where a true range estimate is desired, the threat assessment unit 124 can determine target speed-to-size ratio from the reconstructed scaled three-dimensional trajectory, e.g., in 1250. Then in 1252, target speed-to-size ratio can be compared with the speed-to-size ratios and probabilities of known real collision threats with a match indicating that the target is a collision threat. Optionally, the motion of the host aircraft relative to the ground can be tracked, e.g., by the target detection unit 118, and factored into this probabilistic true range determination for better accuracy.

Short term intensity spikes may result, for example, from momentary specular reflections. These short term intensity spikes tend to cause ranging jitter that can impair collision threat assessments. So, for enhanced collision threat assessment accuracy and stability, the threat assessment unit 124 can remove or filter these short term intensity spikes, e.g., in 1248, using any suitable technique such as are well known in the art.

Figure 4:
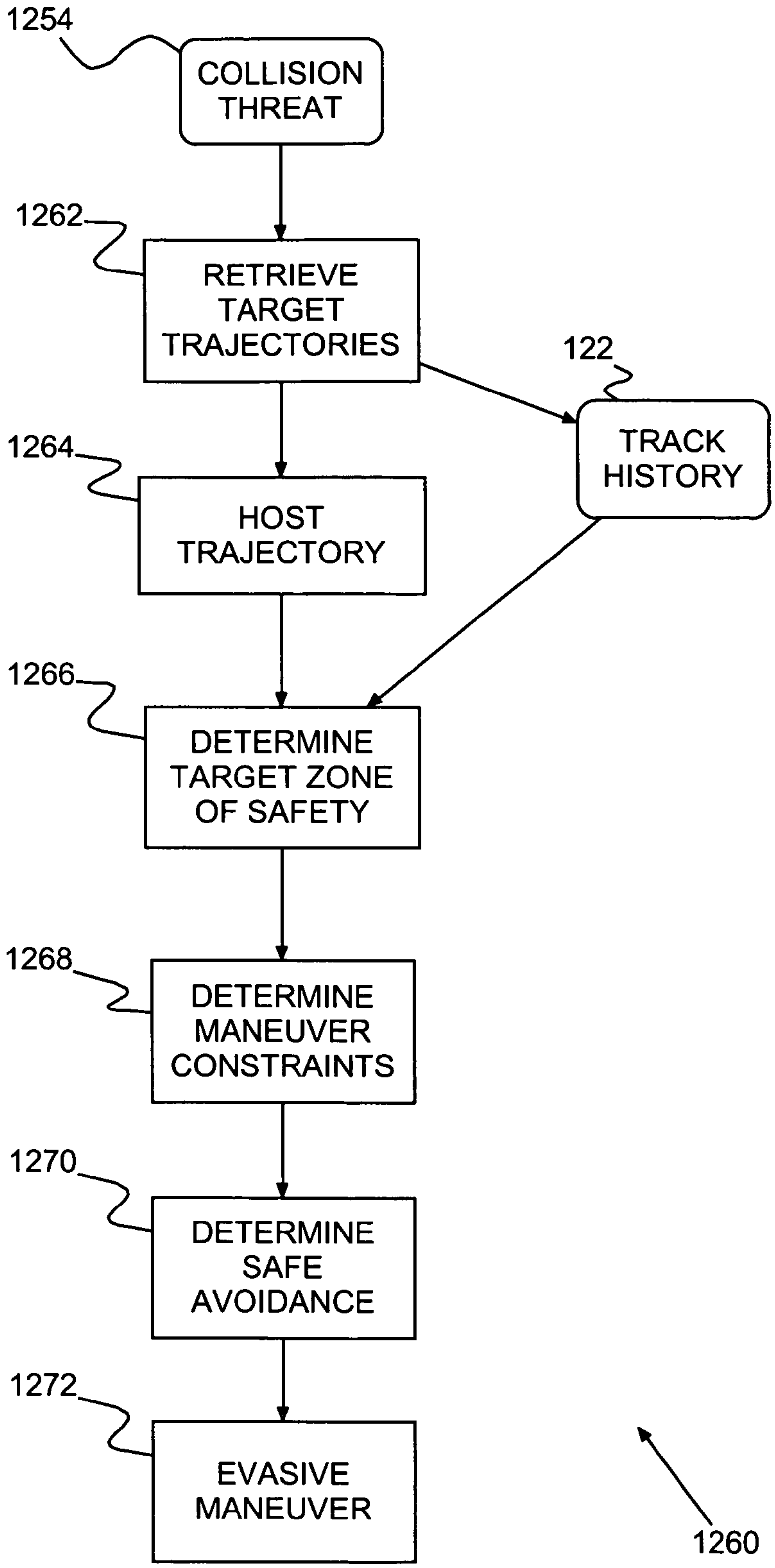
FIG. 4 shows an example of developing avoidance maneuvers upon a determination that a target represents a collision threat.

FIG. 4 shows an example of developing avoidance maneuvers, e.g., by the avoidance maneuver unit 126 upon a determination by the threat assessment unit 124 that a target represents a collision threat 1254. In 1262, the avoidance maneuver unit 126 retrieves track histories for other non-threat targets from track history storage 122. In 1264 the avoidance maneuver unit 126 determines the host aircraft's trajectory. The avoidance maneuver unit 126 must consider trajectories of all local targets to avoid creating another and, perhaps, more imminent threat with another target. So, in 1266 the avoidance maneuver unit 126 determines a safety zone to avoid the collision threat 1254 by a distance in excess of a specified minimum safe distance. However, the aircraft must not execute an excessively violent maneuver that might imperil itself (e.g., by exceeding defined vehicle safety parameters or operating limits) while avoiding an identified threat. So, in 1268 the avoidance maneuver unit 126 determines maneuver constraints. Then, in 1270 the avoidance maneuver unit 126 uses a best estimate of all tracked aircraft in the vicinity, together with host aircraft trajectory data to determine an evasive maneuver 1272 that separates the host craft from the identified threat (and all other aircraft in the vicinity) by a distance that is in excess of the specified minimum safe distance. The evasive maneuver 1272 is passed to flight control and guidance (e.g., 116 in FIG. 2) for an unmanned vehicle or to a pilot for a manned vehicle. After the evasive maneuver 1272 is executed, target monitoring continues, collecting images, identifying targets and determining if any of the identified targets poses a collision threat.

In alternative embodiments, the image interrogator 112 may be implemented using a combination of one or more FPGAs with one or more parallel processing devices for higher level computing capability, as may be required for the threat assessment and avoidance maneuver calculations.

Advantageously, a preferred collision sense and avoidance system 110 provides a "See & Avoid" or "Detect and Avoid" capability to any aircraft, not only identifying and monitoring local targets, but also identifying any that may pose a collision threat and providing real time avoidance maneuvers. The preferred image interrogator 112 may be contained within a small image processing hardware module that contains the hardware and embedded software and that weighs only a few ounces. Such a dramatically reduced size and weight enables making classic detection and tracking capability available even to a small UAV, e.g., ScanEagle or smaller. Thus, the preferred collision sense and avoidance system 110 may be used with both manned and unmanned aircraft. In a manned aircraft, the preferred collision sense and avoidance system 110 augments the pilot's vision. In an unmanned aircraft, the preferred collision sense and avoidance system 110 may be substituted for the pilot's vision, detecting aircraft that may pose collision risks, and if necessary, proposing evasive maneuvers to the unmanned aircraft's flight control.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. An image interrogator identifying and avoiding potential collision threats, said image interrogator comprising:

a clutter suppression and target detection unit detecting moving targets from local images;

a Line Of Sight (LOS), multi-target tracking unit tracking detected said targets from each target's focal plane track and from attitude;

a threat assessment unit correlating a LOS track for said targets to construct a three-dimensional (3D) relative trajectory for each of said targets and determining from said 3D relative trajectories whether any tracked target poses a collision threat; and an avoidance maneuver unit determining a maneuver to avoid any identified said collision threat, wherein said image interrogator is vehicle mountable, and when mounted on an unmanned vehicle guiding said unmanned vehicle in unchaperoned travel in 3D space.

2. An image interrogator as in claim 1, wherein said image interrogator further comprises a target track history, said LOS, multi-target tracking unit maintaining a track history in each target's focal plane for each said tracked target in said target track history.

3. An image interrogator as in claim 1, wherein said threat assessment unit determines whether each said tracked target poses a collision threat based on a respective track history in each respective target's focal plane.

4. An image interrogator as in claim 1, wherein said threat assessment unit categorizes each said tracked target as either not on a collision course or on a possible collision course without determining the range to each said tracked target.

5. An image interrogator as in claim 4, wherein said each tracked target categorized as on a collision course maintains a track at a constant angle to a host aircraft containing said image interrogator.

6. An image interrogator as in claim 4, wherein said threat assessment unit further categorizes each said tracked target categorized as on a possible collision course as either a likely collision threat or not a likely collision threat.

7. An image interrogator as in claim 6, wherein waxing said targets on a possible collision are categorized as likely collision threats and waning said targets on a possible collision are categorized as not likely collision threats.

8. An image interrogator as in claim 1, wherein said image interrogator is contained in a host aircraft, and said avoidance maneuver unit selects a maneuver to avoid a collision for said host aircraft, said maneuver being selected based on trajectories of all said targets and avoiding collision with said all targets, said host aircraft being guided in pilotless unchaperoned flight in air space.

9. An image interrogator as in claim 1, wherein said image interrogator comprises at least one Field Programmable Gate Array (FPGA) processor in an aircraft and containing said image interrogator.

10. An aircraft comprising:

a plurality of motion sensors sensing local images;

an image interrogator guiding said aircraft in unchaperoned pilotless flight, said image interrogator comprising:

a clutter suppression and target detection unit detecting moving targets from said local images, a Line Of Sight (LOS), multi-target tracking unit, tracking detected said targets from each target's focal plane track and from the aircraft attitude, a target track history, said LOS, multi-target tracking unit maintaining a track history in LOS coordinates for each detected target in said target track history;

a threat assessment unit correlating a LOS track for said targets to construct a three-dimensional (3D) relative trajectory for each of said targets and determining from said 3D relative trajectories whether any tracked target poses a collision threat, and an avoidance maneuver unit determining a maneuver to avoid any identified said collision threat; and a flight control and guidance unit receiving avoidance maneuvers from said avoidance maneuver unit and selectively executing said received avoidance maneuvers.

11. An aircraft as in claim 10, wherein said threat assessment unit determines whether each said tracked target poses a collision threat based on a respective target track history without determining the range to each said tracked target.

12. An aircraft as in claim 11, wherein said threat assessment unit categorizes each said tracked target as either not on a collision course or on a possible collision course with said aircraft, and each said tracked target categorized as on a collision course maintains a track at a constant angle to said aircraft.

13. An aircraft as in claim 11, wherein said threat assessment unit categorizes each said tracked target as either not on a collision course or on a possible collision course with said aircraft, each said tracked target categorized as on a possible collision further categorized as either a likely collision threat or not a likely collision threat to said aircraft.

14. An aircraft as in claim 13, wherein waxing said targets are categorized as likely collision threats and waning said targets are categorized as not likely collision threats.

15. An aircraft as in claim 10, wherein said image interrogator is implemented in at least one Field Programmable Gate Array processor fixed to said aircraft.

16. An aircraft as in claim 10, wherein said avoidance maneuver unit selects a maneuver for said aircraft based on trajectories of all said targets and avoiding collision with said all targets.

17. An aircraft as in claim 10, wherein said plurality of sensors comprises a plurality of imaging sensors.

18. An aircraft as in claim 10, wherein said plurality of sensors comprises a plurality of infrared sensors.

19. An aircraft as in claim 10, wherein said aircraft is an Unmanned Air Vehicle (UAV) flying unchaperoned.

20. A method of detecting and tracking targets by an airborne vehicle, the vehicle having a plurality of imaging sensors, said method comprising:

providing a module for angles only imaging, said module receiving inputs from the plurality of imaging sensors on the vehicle, the module having logic for processing a plurality of images from the plurality of imaging sensors;

processing the plurality of images to detect targets against cluttered backgrounds; and creating time histories in the module from each target's focal plane track and from the vehicle attitude, the time histories being of the relative motion of the targets in Line Of Sight (LOS) coordinates;

wherein the module comprises a field programmable gate array processor and guides said vehicle in, unchaperoned, unmanned flight.

21. The method of claim 20, wherein the module is provided on an unmanned air vehicle, providing a threat assessment by correlating a LOS track for said targets to construct a three-dimensional (3D) relative trajectory for each of said targets and determining from said 3D relative trajectories whether any tracked target poses a collision threat to guide said unmanned vehicle in pilotless unchaperoned flight.

22. The method of claim 20, wherein the module is provided on a manned vehicle, providing a threat assessment by correlating a LOS track for said targets to construct a three-dimensional (3D) relative trajectory for each of said targets and determining from said 3D relative trajectories whether any tracked target poses a collision threat to said manned vehicle.

23. The method of claim 20, wherein processing the plurality of images comprises using single frame processing and a convolution with an Optical Point Spread Function.

24. The method of claim 20, wherein processing the plurality of images comprises using a multi-frame moving target detection algorithm.

25. A method of detecting and avoiding target collision by an airborne vehicle, the vehicle having a plurality of imaging sensors, said method comprising:

providing a module for angles only imaging, said module receiving inputs from the plurality of imaging sensors on the vehicle, the module having logic for processing a plurality of images from the plurality of imaging sensors, the module comprising a field programmable gate array processor;

processing the plurality of images to detect targets against cluttered backgrounds;

creating from each target's focal plane track and from the aircraft attitude time histories of the relative motion of the targets in Line Of Sight (LOS) coordinates;

assessing a level of collision threat with one or more of the targets by correlating a LOS track for said targets to construct a three-dimensional (3D) relative trajectory for each of said targets and determining from said 3D relative trajectories whether any tracked target poses a collision threat; and commanding the vehicle to avoid collision with the one or more targets, the vehicle flying unchaperoned in air space.

26. The method of claim 25, wherein assessing the level of collision threat comprises:

selecting a target from said detected targets;

determining a 3D trajectory for said selected target from the selected target's focal plane track in LOS coordinates;

determining whether said 3D trajectory passes said airborne vehicle by more than a selected minimum safe distance;

selecting another target from said detected targets; and returning to the step of determining a 3D trajectory for said selected target.

27. The method of claim 26, wherein whenever said 3D trajectory for said selected target is determined to be passing said airborne vehicle by less than said selected minimum safe distance, said target is identified as a collision threat.

28. The method of claim 26, wherein determining said 3D trajectory comprises determining a line of sight (LOS) trajectory from said selected target's focal plane track for said selected target to said airborne vehicle; and determining an apparent range change between said selected target and said airborne vehicle.

29. The method of claim 27 providing detect and avoid capability to said airborne vehicle and, wherein a target speed-to-size ratio is determined from said 3D trajectory and determining whether said trajectory for said selected target is passing said airborne vehicle by less than said selected minimum safe distance comprises comparing determined said target speed-to-size ratio results with speed-to-size ratios and probabilities of known real collision threats.

30. The method of claim 25, wherein commanding the vehicle to avoid collision comprises:

retrieving trajectories for all detected said targets;

determining a minimum safe distance for said airborne vehicle from each target identified as collision threat; and determining a maneuver for said airborne vehicle to avoid all detected said targets.

31. The method of claim 30 providing said airborne vehicle with a capability of pilotless unchaperoned flight and wherein a trajectory for said airborne vehicle is determined before determining said minimum safe distance.

32. The method of claim 31 wherein determining said maneuver comprises:

determining maneuvering constraints for said airborne vehicle, said maneuvering constraints constraining said airborne vehicle from executing maneuvers exceeding defined vehicle operating limits; and determining an evasive maneuver to avoid each said collision threat for said airborne vehicle within said maneuvering constraints.

* * * * *